United States Patent
Harris et al.

(10) Patent No.: US 10,924,585 B1
(45) Date of Patent: Feb. 16, 2021

(54) METHOD AND APPARATUS FOR PARSING AND DIFFERENTLY PROCESSING DIFFERENT PORTIONS OF A REQUEST

(71) Applicant: McKesson Corporation, Irving, TX (US)

(72) Inventors: Patrick Harris, Brookhaven, GA (US); Jessica Russell, Woodstock, GA (US); Allan Marks, Alpharetta, GA (US); Melissa Frechen, Atlanta, GA (US)

(73) Assignee: MCKESSON CORPORATION, Irving, TX (US)

( * ) Notice: Subject to any disclaimer, the term of this patent is extended or adjusted under 35 U.S.C. 154(b) by 8 days.

(21) Appl. No.: 15/422,184

(22) Filed: Feb. 1, 2017

(51) Int. Cl.
*H04L 29/08* (2006.01)
*H04L 12/58* (2006.01)

(52) U.S. Cl.
CPC ............ *H04L 67/327* (2013.01); *H04L 51/04* (2013.01); *H04L 51/043* (2013.01); *H04L 51/08* (2013.01)

(58) Field of Classification Search
CPC .................................................... H04L 67/327
See application file for complete search history.

(56) References Cited

U.S. PATENT DOCUMENTS

| | | |
|---|---|---|
| 2001/0039589 A1 | 11/2001 | Aho et al. |
| 2006/0085385 A1 | 4/2006 | Foster et al. |
| 2007/0202886 A1 | 8/2007 | Dhebri et al. |
| 2007/0260750 A1* | 11/2007 | Feied .................. H04L 67/06 709/246 |
| 2013/0041968 A1 | 2/2013 | Cohen et al. |
| 2015/0088557 A1* | 3/2015 | Huynh ................. G06Q 40/08 705/4 |
| 2015/0149197 A1 | 5/2015 | Guinan |
| 2015/0154565 A1 | 6/2015 | Kaehler et al. |

(Continued)

FOREIGN PATENT DOCUMENTS

| | | |
|---|---|---|
| CN | 102362778 | 2/2012 |
| KR | 100755440 | 9/2007 |

(Continued)

OTHER PUBLICATIONS

Decision to Grant European Patent Application No. 13809457.8 dated May 18, 2017.

(Continued)

*Primary Examiner* — Nicholas P Celani
(74) *Attorney, Agent, or Firm* — Alston & Bird LLP (57) ABSTRACT

A method, apparatus and computer program product modify messaging behavior based upon parsing and different processing of different portions of a request. In a method, a request is received that includes a first and second differently formatted portions. The method parses the request to separately identify the first and second portions, analyzes the second portion of the request and causes a message based at least in part upon the first portion to be transmitted to a request processor. Based upon the message including the first portion, the method receives a response from the request processor. Based upon the response from the claims processor, the method causes a response to the request to be provided. The message to the request processor or the response to request is modified or an additional message to another entity is transmitted based upon an analysis of the second portion of the request.

22 Claims, 5 Drawing Sheets

(56) References Cited

U.S. PATENT DOCUMENTS

2015/0213195 A1* 7/2015 Blechman .............. G16H 10/60
705/51
2016/0307195 A1* 10/2016 Cantwell .............. G06Q 20/401

FOREIGN PATENT DOCUMENTS

| KR | 100793852 | 1/2008 |
|---|---|---|
| KR | 101038074 | 6/2011 |
| KR | 101101692 | 12/2011 |
| KR | 20110138108 | 12/2011 |
| KR | 20110138572 | 12/2011 |
| KR | 101154858 | 3/2012 |

OTHER PUBLICATIONS

Extended European Search Report for European Application No. 13809457.8 dated Apr. 15, 2016

Office Action for U.S. Appl. No. 15/925,011 dated Jun. 27, 2019.
Office Action for U.S. Appl. No. 15/925,948 dated Jun. 25, 2019.
Office Action for U.S. Appl. No. 15/925,948 dated Oct. 23, 2019.
Office Action for U.S. Appl. No. 15/925,011 dated Oct. 24, 2019.
United States Patent and Trademark Office, Office Action for U.S. Appl. No. 15/925,011, dated Apr. 8, 2020, 27 pages, U.S.A.
United States Patent and Trademark Office, Office Action for U.S. Appl. No. 15/925,948, dated Mar. 23, 2020, 29 pages, U.S.A.
United States Patent and Trademark Office, Advisory Action for U.S. Appl. No. 15/925,011, dated Jan. 31, 2020, 4 pages, U.S.A.
United States Patent and Trademark Office, Advisory Action for U.S. Appl. No. 15/925,948, dated Jan. 31, 2020, 4 pages, U.S.A.
United States Patent and Trademark Office, Office Action received for U.S. Appl. No. 15/925,011, dated Oct. 8, 2020, 22 pages, U.S.A.
United States Patent and Trademark Office, Notice of Allowance received for U.S. Appl. No. 15/925,948, dated Nov. 5, 2020, 22 pages, U.S.A.

* cited by examiner

METHOD AND APPARATUS FOR PARSING AND DIFFERENTLY PROCESSING DIFFERENT PORTIONS OF A REQUEST

TECHNOLOGICAL FIELD

An example embodiment of the present invention relates to providing for a plurality of different actions to be taken in response to receipt of an electronic message and based upon parsing and differently processing different portions of the electronic message.

BACKGROUND

Messages are frequently transmitted in accordance with a predefined structure. The predefined structure generally defines the fields of information included within the message and the format in which the information is presented within each of the fields. While structured messages of this type are useful in terms of insuring that at least certain types of information are included within the message and that those certain types of information are transmitted in a manner that may be readily and consistently interpreted by the recipient, structured messages may limit the types of information that are conveyed and correspondingly limit the functionality that can be supported by messages having the predefined structure.

By way of example, the limitations upon the information that may be conveyed via a structured message and the format in which the information must be conveyed may prevent that message from supporting additional functionality needed by the sender or recipient, or require supplemental messages to be transmitted in order to provide additional information to the same recipient, particularly in instances in which the additional information is required in order for the recipient to perform additional functionality or services. This increase in the number of messages so as to provide additional information beyond that supported by structured messages not only increases the complexity and processing demands upon the source and recipient of the messages in order for the source to construct such supplemental messages, and for the recipient to link and interpret the additional messages, but also increases the load upon the network that must transmit the additional messages, as well as the risk of loss of such additional information in the event of errors when attempting to link or associate the supplemental messages.

BRIEF SUMMARY

A method, computing device and computer program product are provided in accordance with an example embodiment in order to facilitate the inclusion of additional information in a single message beyond that for which the original message structure is predefined. As a result, the functionality or services performed by or for the source or recipient of the message may be enhanced by reliance upon the additional information that may be included in the message. By including additional information in the message in a manner that is able to be interpreted by the source or recipient, the method, computing device and computer program product of an example embodiment reduces or at least limits any increase in the number of messages transmitted between a source and the recipient in order to convey the additional information so as to enable the provision of the additional functionality or services, thereby reducing or limiting any increase in the load otherwise imposed upon the network that supports the delivery of the messages. Similarly, the method, computing device and computer program product of an example embodiment increase the efficiency with which the source and recipient communicate by reducing the number of messages that must be constructed by the source and linked and interpreted by the recipient in order to convey the additional information, as well as reducing or eliminating the risk of loss of such additional information in the event of errors when attempting to link or associate the supplemental messages.

In one embodiment, a computing device is provided that is configured to parse and differently process different portions of an electronic message. The computing device includes a communication interface configured to receive the electronic message. The electronic message includes a first portion formatted in accordance with a first predefined format and a second portion formatted differently than the first predefined portion. The computing device also includes processing circuitry configured to parse the electronic message to separately identify the first and second portions and to analyze the second portion of the electronic message to identify an action to be taken based thereupon. The second portion of the electronic message is analyzed by identifying a predefined type of information included within the second portion. The processing circuitry is also configured to construct a first message based at least in part upon the first portion formatted in accordance with the first predefined format to be transmitted to a request processor. Based upon the first message including the first portion formatted in accordance with the first predefined format, the processing circuitry is further configured to receive a first response from the request processor and to transform the information included within the second portion so as to have a second predefined format, different that the first predefined format. The processing circuitry is additionally configured to construct a second message including the information transformed to have the second predefined format to be transmitted to an entity different than the request processor and different than a source of the electronic message. Based upon the second message including the information transformed to have the second predefined format, the processing circuitry is configured to receive a second response from the entity and, based upon at least one of the first response from the request processor or the second response from the entity, the processing circuitry is configured to construct a response to the electronic message that is to be transmitted. The computing device further includes a database in communication with the processing circuitry and configured to store one or more of the electronic message, the first message, the first response, the second message, the second response or the response to the electronic message.

The processing circuitry of an example embodiment is configured to parse the electronic message by parsing the electronic message to identify a qualifier indicative of a presence of the second portion within the electronic message. In an example embodiment, the processing circuitry is configured to analyze the second portion of the electronic message by identifying a system edit instruction. In this embodiment, the processing circuitry is configured to construct the first message to be transmitted to the request processor by modifying the first portion in accordance with the system edit instruction prior to transmitting the message to the request processor. The processing circuitry of an example embodiment is further configured to identify a document to be provided. In this embodiment, the processing circuitry is configured to construct the response to the electronic message that is provided based upon information from the first or second portion of the electronic message, the first response from the request processor or the second response from the entity to include an access mechanism, such as an address, e.g., Uniform Resource Locator (URL), associated with the document, that is accessible in order to retrieve the document. The document to be provided may be stored. In addition, the processing circuitry may be configured to control access to the document and to maintain a record of access to the document. The processing circuitry of an example embodiment is configured to analyze the second portion of the electronic message to identify a role indicator. The action to be taken is based upon the role indicator. In this embodiment, the processing circuitry is configured to condition transmission of the first message to the request processor or provision of the response to the electronic message upon the role indicator having a predefined value.

In another embodiment, a method is provided for parsing and differently processing different portions of an electronic message. The method includes receiving the electronic message. The electronic message includes a first portion formatted in accordance with a first predefined format and a second portion formatted differently than the first predefined portion. The method also includes parsing the electronic message to separately identify the first and second portions and analyzing the second portion of the electronic message to identify an action to be taken based thereupon. In this regard, analyzing the second portion of the electronic message includes identifying a predefined type of information included within the second portion. The method further includes constructing a first message based at least in part upon the first portion formatted in accordance with the first predefined format to be transmitted to a request processor and, based upon the first message including the first portion formatted in accordance with the first predefined format, receiving a first response from the request processor. The method additionally includes transforming the information included within the second portion so as to have a second predefined format, different than the first predefined format, and constructing a second message including the information transformed to have the second predefined format to be transmitted to an entity different than the request processor and different than a source of the electronic message. Based upon the second message including the information transformed to have the second predefined format, the method includes receiving a second response from the entity and, based upon at least one of the first response from the request processor or the second response from the entity, constructing a response to the electronic message that is to be transmitted. The method further includes storing, in a database, one or more of the electronic message, the first message, the first response, the second message, the second response or the response to the electronic message.

The method of an example embodiment parses the electronic message by parsing the electronic message to identify a qualifier indicative of a presence of the second portion within the electronic message. In an example embodiment, the method analyzes the second portion of the electronic message by identifying a system edit instruction. The method of this example embodiment also constructs the first message to be transmitted to the request processor by modifying the first portion in accordance with the system edit instruction prior to transmitting the message to the request processor. In an example embodiment, the method identifies a document to be provided and constructs the response to the electronic message to be provided based upon information from the first or second portion of the electronic message, the first response from the request processor or the second response from the entity so as to include an access mechanism, such as a Uniform Resource Locator (URL) associated with the document, that is accessible in the response in order to permit the document to be retrieved using the access mechanism. The document to be provided may be stored. In addition, the processing circuitry may be configured to control access to the document and to maintain a record of access to the document. The method of an example embodiment analyzes the second portion of the electronic message by identifying a role indicator. The action to be taken is based upon the role indicator. In this example, the method further includes conditioning transmission of the first message to the request processor or provision of the response to the electronic message upon the role indicator having a predefined value.

In yet another example embodiment, a computer program product is provided that is configured to parse and differently process different portions of an electronic message. The computer program product includes a non-transitory computer readable medium having program code stored thereon with the program code including program code instructions configured, upon execution, to receive the electronic message. The electronic message includes a first portion formatted in accordance with a first predefined format and a second portion formatted differently than the first predefined portion. The program code also includes program code instructions configured to parse the electronic message to separately identify the first and second portions and program code instructions configured to analyze the second portion of the electronic message to identify an action to be taken based thereupon. In this regard, the second portion of the electronic message is analyzed by identifying a predefined type of information included within the second portion. The program code further includes program code instructions configured to construct a first message based at least in part upon the first portion formatted in accordance with the first predefined format to be transmitted to a request processor. Based upon the first message including the first portion formatted in accordance with the first predefined format, the program code additionally includes program code instructions configured to receive a first response from the request processor and program code instructions configured to transform the information included within the second portion so as to have a second predefined format, different that the first predefined format. The program code also includes program code instructions configured to construct a second message including the information transformed to have the second predefined format to be transmitted to an entity different than the request processor and different than a source of the electronic message. The program code also includes program code instructions configured, based upon the second message including the information transformed to have the second predefined format, to receive a second response from the entity, and, based upon at least one of the first response from the request processor or the second response from the entity, to construct a response to the electronic message that is to be transmitted. The program code further includes program code instructions configured to store, in a database, one or more of the electronic message, the first message, the first response, the second message, the second response or the response to the electronic message.

The program code instructions of an example embodiment that are configured to parse the electronic message include program code instructions configured to parse the electronic message to identify a qualifier indicative of a presence of the second portion within the electronic message. In an example embodiment, the program code instructions configured to analyze the second portion of the electronic message include program code instructions configured to identify a system edit instruction. In this embodiment, the program code instructions configured to construct the first message to be transmitted to the request processor include program code instructions configured to modify the first portion in accordance with the system edit instruction prior to transmitting the message to the request processor. In an example embodiment, the program code further includes program code instructions configured to identify a document to be provided, and the program code instructions configured to cause the response to the electronic message to be provided include program code instructions configured to construct the response to the electronic message that is provided based upon information from the first or second portion of the electronic message, the first response from the request processor or the second response from the entity so as to include an access mechanism that is accessible in order to retrieve the document. The program code instructions configured to analyze the second portion of the electronic message in accordance with an example embodiment include program code instructions configured to identify a role indicator. The action to be taken is based upon the role indicator. In this embodiment, the program code further includes program code instructions configured to condition transmission of the first message to the request processor or provision of the response to the electronic message upon the role indicator having a predefined value.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, computing device, and computer program product are provided in accordance with an example embodiment in order to process electronic messages having a first portion with a predefined format and a second, differently formatted second portion that includes additional information by transforming the additional information, constructing other messages based thereupon and updating a database including one or more of the messages. The first portion of the electronic message may provide the information typically provided by a structured message. By providing for the inclusion of the additional information along with the first portion in the same electronic message, however, the electronic message may efficiently convey other types of information from a source to a recipient, thereby reducing or at least limiting any increase in the number of messages transmitted between the source and the recipient in order to convey the additional information which, in turn, reduces or limits any increase in the load otherwise imposed upon the network that supports the delivery of the electronic messages. Moreover, the additional information included in the electronic message may facilitate the provision of additional functionality and services by the recipient or others in response to the electronic message that was not previously available.

Figure 1:
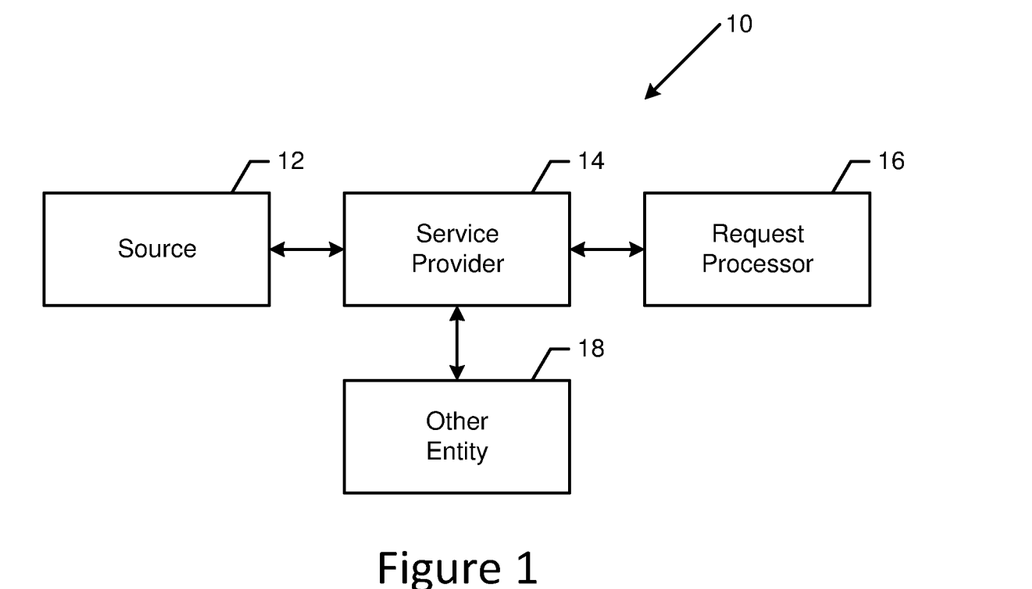
FIG. 1 is a diagram of a system configured to process and exchange electronic messages in accordance with an example embodiment of the present invention.

By way of example, a system 10 that is configured to communicate and process electronic messages having a first portion with a predefined format and a second, differently formatted second portion that includes additional information is depicted in FIG. 1. As shown, the electronic message may be provided by a source 12 and received by a service provider 14, such as a switch. After parsing and differently processing the different portions of the electronic message provided by the source, the service provider is configured to communicate with a request processor 16 and, in some embodiments, with other entities 18. Although the method, computing device and computer program product may be employed in various applications, the method, computing device and computer program product of example embodiments are employed in conjunction with electronic messages conveying additional information that communicated and processed in conjunction with telecommunication applications, content delivery and provisioning and healthcare applications, such as in conjunction with the submission and evaluation of prescription claims, such as a prescription claim submitted by a pharmacy management system, and the provision of feedback regarding reimbursement of the pharmacy by a claims payor, e.g., an insurance company or the like, to name but a few.

Figure 2:
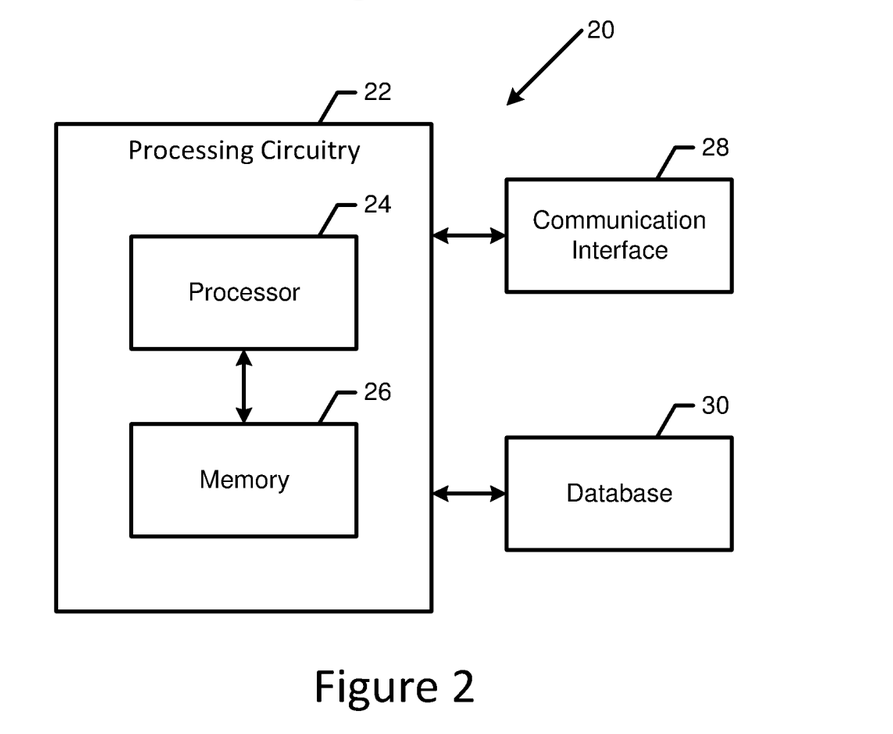
FIG. 2 is a block diagram of a computing device that may be specifically configured in accordance with an example embodiment of the present invention.

The service provider 14 may be configured in various manners, but, in embodiment, the service provider includes a computing device 20 configured to parse and differently process different portions of an electronic message and may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the request processor 16 and other entities 18. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database 30 includes information accessed and stored by the processing circuitry 22 to facilitate the operations of the service provider 14. For example, the database 30 may comprise a series of tables configured to store information regarding different types of messages and/or portions of different types of messages as described below.

Figure 3:
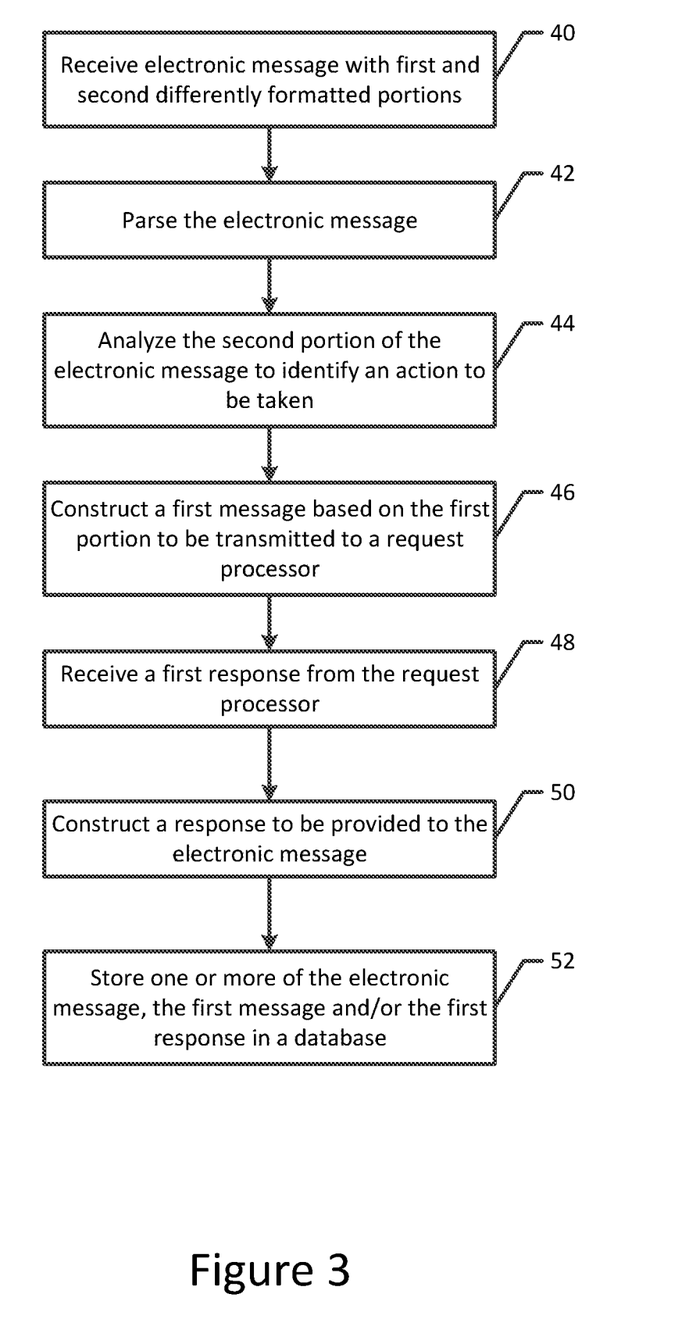
FIG. 3 is a flow chart illustrating the operations performed, such as by the switch of FIG. 1 embodied by the computing device of FIG. 2, in accordance with an example embodiment of the present invention.

The operations performed by the computing device 20 embodied by the service provider 14 are depicted in an example embodiment in FIG. 3. As shown, the computing device of an example embodiment, such as the communication interface 28, the processing circuitry 22, the processor 24 or the like, is configured to receive an electronic message from a source as shown in block 40 of FIG. 3. Although different types of electronic messages may be received depending upon the application, the electronic message may be an electronic healthcare request, such as a prescription claim request, prescription reversal request, predetermination of benefits request or the like, is generated by a pharmacy management system and is directed to the service provider, e.g., switch, for processing prior to submission to a request processor 16 in the form of a claims processor for adjudication. In this embodiment, the electronic healthcare request typically includes information that identifies the patient, the medication, product, or service being requested, the healthcare provider (either the prescriber, pharmacy or both), and the benefit plan, insurer, or government-funded payor for the patient.

A pharmacy management system may be operated by a pharmacy in order to track the fulfillment of the various prescriptions and to submit claims for reimbursement, requests for the predetermination of benefits or the like via the service provider 14 to various claim payors in order to facilitate reimbursement of the pharmacy for the cost of the medications dispensed. The service provider, in turn, communicates with one or more claims processors in order to obtain an analysis of the claim or other request submitted by the pharmacy management system. In the context of a predetermination of benefits request, the claims processor responds with an indication as to whether or not the claim will be reimbursed and, if so, to what extent and the service provider, in turn, provides this information to the pharmacy management system. Armed with the information regarding the reimbursement expected for a particular prescription, a pharmacy management system may direct fulfillment of the prescription and/or communication between a pharmacist and a patient regarding the cost of the prescription that is not reimbursable and that must be borne by the patient. As described below, the system of this example embodiment may also include another entity 18 in the form of a medical claims processor in communication with the service provider and configured to provide information regarding the reimbursement of medical services provided at the pharmacy, such as by a pharmacist, thereby permitting integration of claims for reimbursement, requests for the predetermination of benefits or the like provided by a pharmacy management system for both prescription claims and medical services claims in order to increase the overall system efficiency and to reduce the overall load upon the network supporting the message traffic.

Figure 4:
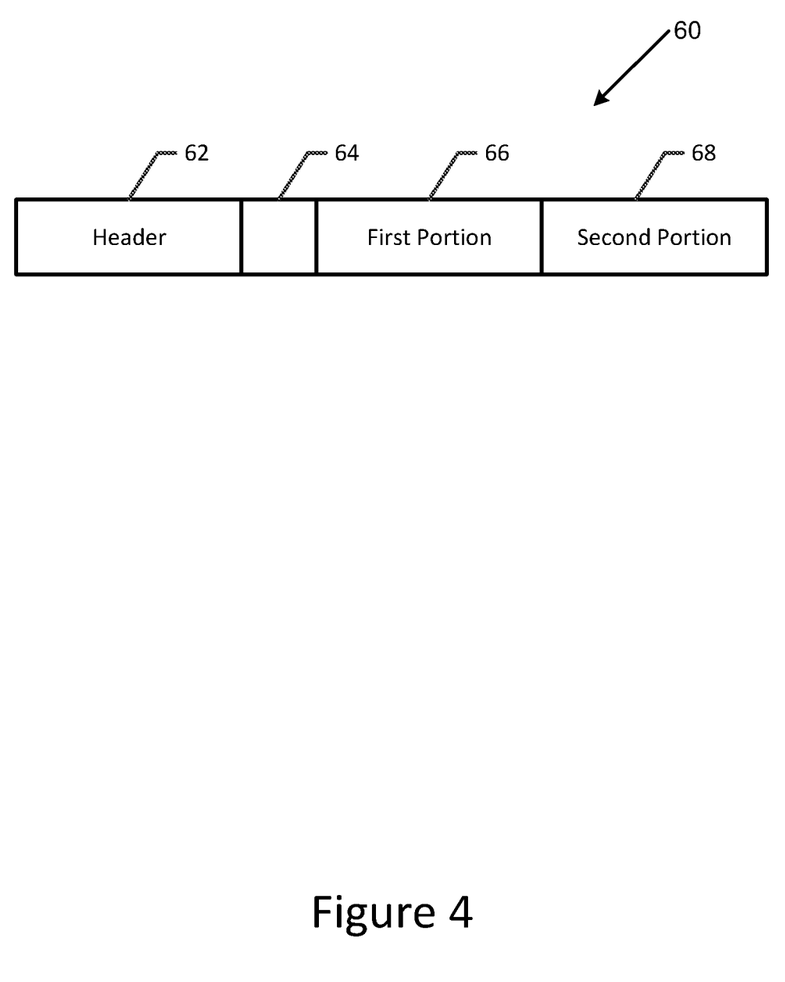
FIG. 4 is an example of an electronic message that is processed in accordance with an example embodiment of the present invention.

Regardless of the type of electronic message, the electronic message includes a first portion formatted in accordance with a first predefined format and a second portion formatted differently than the first predefined portion. As shown in block 42, the computing device 20, such as the processing circuitry 22, the processor 24 or the like, is configured to parse the electronic message so as to separately identify the first and second portions. The content provided by the first and second portions and the particular formats of the first and second portions may vary depending upon the application and the corresponding type of the electronic message. In the context of an electronic healthcare request, however, one example of an electronic message is depicted in FIG. 4. The electronic healthcare request 60 of this example embodiment includes a wrapper as defined by the header field 62. The header provides various information with respect to the electronic healthcare request and serves to secure the electronic healthcare request such that a recipient can access the payload of the electronic healthcare request only after having satisfied the security requirements imposed by the header. The electronic healthcare request of this example embodiment includes a qualifier 64, such as a flag. A qualifier of an example embodiment has a plurality of different predefined values with each predefined value representative of a different type of electronic healthcare message. The electronic healthcare message of the example embodiment also includes a first portion 66 formatted in accordance with a first predefined format and a second portion 68 formatted differently than the first predefined format. Although the first predefined format may vary from one electronic healthcare message to another, the first portion of an electronic healthcare request of an example embodiment is formatted in accordance with the National Council for Prescription Drug Programs (NCPDP) telecommunications standard that is utilized in conjunction with the submission of prescription claim requests. In contrast, the second portion of the electronic healthcare request may have any of a variety of different formats with the format of the second portion being different that the first predefined format. The qualifier field may include different values indicative of the presence or absence of the second portion, the presence or absence of the first portion as well as an indication as to whether or not the first portion is formatted in accordance with NCPDP.

Following parsing of the electronic message, the computing device 20 embodied by the service provider 14, such as the processing circuitry 22, the processor 24 or the like, is configured to analyze the second portion of the electronic message to identify an action to be taken based thereupon. See block 44 of FIG. 3. With respect to an electronic healthcare message 60 of the type depicted in FIG. 4, for example, the computing device, such as the processing circuitry, the processor or the like, is configured to analyze the qualifier field to determine the presence or absence of the first and second portions and, in some embodiments, the first predefined format utilized for the first portion. In addition, the second portion of the electronic message is analyzed in order to identify a predefined type of information included in the second portion and, in turn, to identify an action to be taken based thereupon. Examples of different predefined types of information included in the second portion and the ensuing actions to be taken based upon the analysis of the second portion of the electronic message are provided below.

After having parsed the electronic message, the computing device 20, such as the processing circuitry 22, the processor 24, the communication interface 28 or the like, is configured to construct a first message to be transmitted to the request processor 16. See block 46 of FIG. 3. The first message is based at least in part upon the first portion of the electronic message and, in some embodiments, includes the first portion from the electronic message received from the source. In the context of an electronic healthcare request, the first message that is constructed may be a prescription reimbursement request or a predetermination of benefits request that is transmitted to a claims processor, such as a claims processor of a payor of prescription claims, e.g., an insurance company. A claims processor is configured to analyze the prescription reimbursement request or the predetermination of benefits request based upon the insurance or other payor rules and to provide a response indicative of whether coverage is provided for the prescription claim that is the subject of the request and, if so, the reimbursement amount that will be paid by the payor to the pharmacy upon dispensation of the medicine that is the subject of the prescription. As noted above, the first message that is transmitted to the claim processor in this example embodiment is based at least in part upon the first portion of the electronic healthcare request and, in some embodiments, includes the first portion of the electronic healthcare request since claims processors may be configured to interpret and analyze a prescription reimbursement request or a predetermination of benefits request submitted in accordance with the first predefined format, such as NCPDP, and do not correspondingly interpret and analyze prescription reimbursement requests or predetermination of benefits requests submitted in accordance with a different format.

Based upon the first message including the first portion, the computing device 20, such as the processing circuitry 22, the processor 24 or the like, is configured to receive a first response from the request processor 16 and, based upon the first response from the request processor, to construct a response to the electronic message to be provided, such as to the source. See blocks 48 and 50 of FIG. 3. As such, the source can receive information, such as feedback or the like, based upon the first portion of the electronic message from the request processor with the computing device embodied by the service provider 14 serving to appropriately configure and direct the first message and the response thereto between the request processor and the source.

In the context of an electronic healthcare request, the first response may provide an indication as to the coverage provided by the claims payor for the prescription that is the subject of the prescription reimbursement request or the predetermination of benefits request. If coverage is provided, the first response may provide a reimbursement amount indicative of the monetary amount for which the pharmacy will be reimbursed by the claims payor in response to dispensation of the medicine that is the subject of the prescription. If coverage is not provided, however, the first response may provide an indication as to the reason for denial of the prescription reimbursement request or the predetermination of benefits request. Based upon the first response from the claims processor, the computing device of this example embodiment causes a response to the electronic healthcare request to be provided, such as to the pharmacy management system. Thus, the pharmacy management system is provided with a response that includes the information provided by the claims processor, such as an indication as to whether the claims payor provides coverage for the prescription reimbursement request or the predetermination of benefits request and, if so, the reimbursement amount associated therewith. Based upon the response to the electronic healthcare request provided by the service provider 14, a pharmacist may proceed to dispense the medication that is the subject of the prescription in an instance in which the pharmacy is to be fully reimbursed by the claims payor or may counsel the patient as to the out-of-pocket amount that the payor must personally pay prior to dispensing the medication in an instance in which the reimbursement amount is less than the full cost of the medication.

As shown in block 52, the computing device 20, such as the processing circuitry 22, the processor 24, the database 30 or the like, is configured to store one or more of the electronic message, the first message to the request processor 16, the first response from the request processor and/or the response to the electronic message in the database. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

Based upon the parsing of the electronic message and the analysis of the second portion of the electronic message, the service provider 14 is configured to provide additional functionality based upon the second portion of the electronic message. For example, based upon an analysis of the second portion of the electronic message, the first message transmitted to the request processor 16 or the response to the electronic message that is provided to the source may be modified, such as by including additional or different information. Alternatively, based upon the analysis of the second portion of the electronic message, an additional message may be transmitted to an entity 18 different than the request processor and different than the source of the electronic message. For example, the other entity to which the additional message is transmitted may be a medical claims payor such that the computing device 20 embodied by the service provider may not only support prescription claim requests, but also medical claim requests, notwithstanding the fact that medical claim requests are differently formatted than prescription claim requests.

With respect to the modification of the electronic message, in an instance in which the analysis of the second portion of the electronic message identifies a system edit instruction, the computing device 20, such as the processing circuitry 22, the processor 24 or the like, is configured to modify the first portion in accordance with the system edit instruction prior to transmitting the first message that is based upon and, in some embodiments, includes the first portion to the request processor 16. Based upon the modification to the first portion upon which the first message to the request processor is based, the actions taken by the request processor and the first response provided thereby may be correspondingly modified.

By way of example, the second portion of an electronic healthcare message may include a system edit instruction which causes the first message to the claims processor and/or the response to the pharmacy management system to be modified. As different types of system edit instructions may be included within the second portion of the electronic healthcare message, the first message to the claims processor and/or the response to the pharmacy management system may be differently modified depending upon the particular type of system edit instruction included within the second portion of the electronic healthcare message. In this example embodiment, the computing device 20, such as the processing circuitry 22, the processor 24 or the like, is configured to analyze the second portion of the electronic healthcare message and to identify a system edit instruction. In one embodiment, the computing device, such as the processing circuitry, the processor or the like, is configured to modify the first portion parsed from the electronic healthcare request in accordance with the system edit instruction, that is, in a manner defined by the system edit instruction, prior to transmitting the first message, including the first portion, to the claims processor. The first portion may be modified in various manners depending upon the system edit instruction including, for example, modification of the first portion to include additional information, such as an indication of the species of the patient, an indication of the language spoken by the patient, information regarding the role of the pharmacy personnel submitting the prescription reimbursement request or the predetermination of benefits request to permit requests relating to the dispensing of opioids or other risk evaluation and mitigation strategies (REMS) medications that are dependent upon authorization by certain pharmacy personnel, such as a pharmacist, to be processed, or the like.

Figure 5:
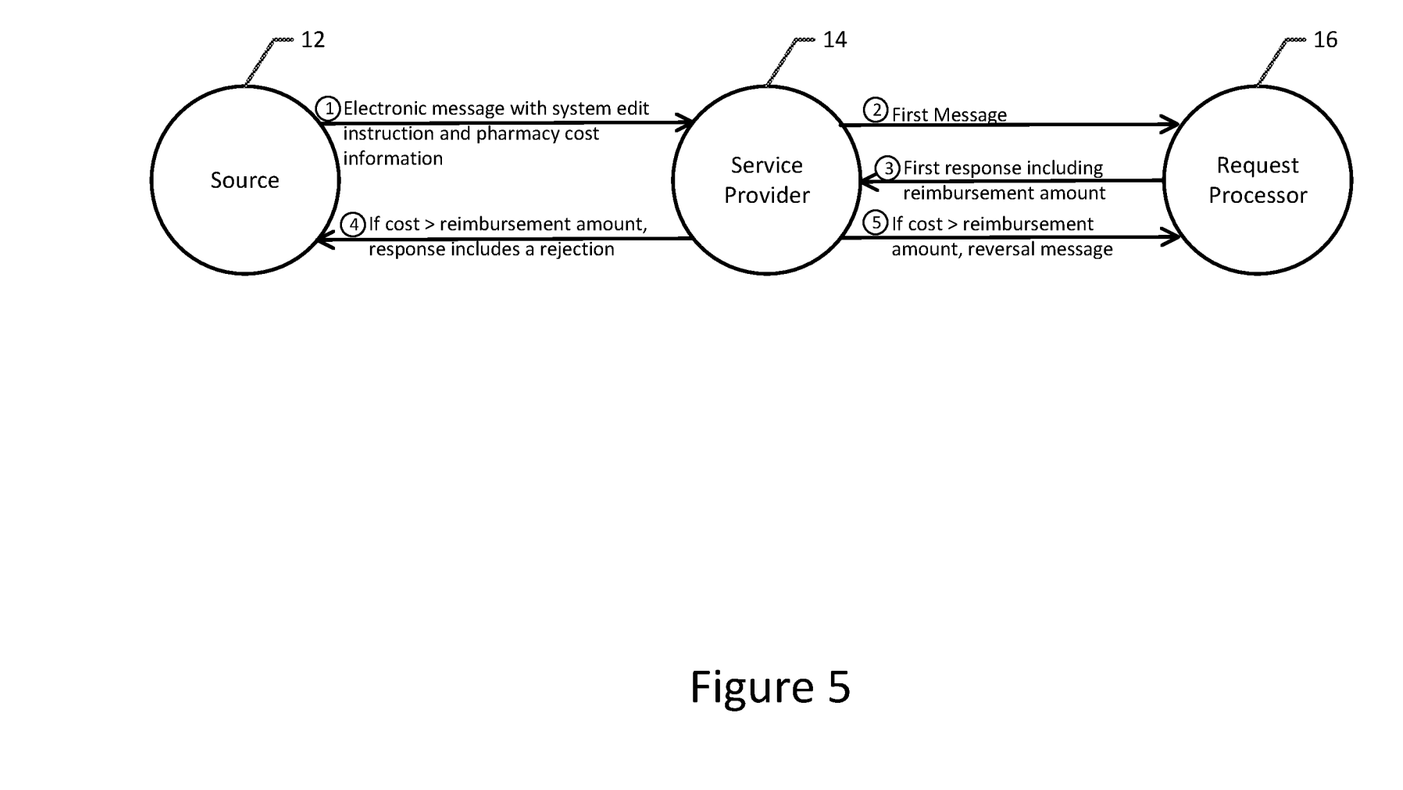
FIG. 5 is a signal flow diagram illustrating the messages exchanged in conjunction with a rejection of a reimbursement request in accordance with an example embodiment of the present invention.

As another example of the action taken with respect to a second portion of an electronic healthcare message in the form of a prescription reimbursement request that includes a system edit instruction, reference is made to the signal flow diagram of FIG. 5. In this regard, the computing device 20, such as the processing circuitry 22, the processor 24 or the like, is configured to analyze the second portion of the electronic healthcare message so as to identify a system edit instruction as well as information regarding a cost paid by the pharmacy for the respective medication that is the subject of the prescription claim request. See signal flow 1 of FIG. 5. As described above, the computing device, such as the processing circuitry, the processor, the communication interface 28 or the like, constructs the first message which is then transmitted to the request processor 16 as shown in signal flow 2. In response, the computing device, such as the processing circuitry, the processor, the communication interface or the like, receives a first response from the request processor including a reimbursement amount, that is, an amount that the prescription claims payor will reimburse the pharmacy upon dispensing of the respective medication. See signal flow 3 in FIG. 5.

In this example embodiment, the computing device 20, such as the processing circuitry 22, the processor 24 or the like, is configured to construct a response to the electronic healthcare message to be provided to, for example, the pharmacy management system by first identifying the reimbursement amount for the prescription claim for the respective medication from the response from the request processor 16 and then comparing the reimbursement amount to the corresponding cost paid by the pharmacy. In an instance in which the cost paid by the pharmacy exceeds the reimbursement amount for the prescription claim, the computing device, such as the processing circuitry, the processor, the communication interface 28 or the like, is configured to cause the response to the electronic healthcare message that is provided to the pharmacy management system to include a rejection of the prescription claim as shown in signal flow 4 of FIG. 5. Thus, in an instance in which the response from the request processor 16 following adjudication of the prescription reimbursement request indicates that the prescription claim will not be paid or will be paid at a reimbursement amount that is less than the cost to the pharmacy of the medication, the response is modified from an indication that the prescription claim will be paid at the reimbursement amount to an indication that the prescription claim is rejected.

As such, the pharmacy management system need not separately analyze the reimbursement amount provided by the request processor 16, determine that the reimbursement amount is less that then cost to the pharmacy for the respective medication and, in turn, transmit another electronic healthcare request in the form of a reversal in order to reverse the prior adjudication provided by the request processor. Consequently, the computing device 20 of this example embodiment reduces the messaging traffic supported by the network, thereby advantageously reducing the network load and reducing the processing demand upon the pharmacy management system and the request processor by reducing the number of separate messages that must be processed thereby. In this example embodiment, in an instance in which the cost paid by the pharmacy exceeds the reimbursement amount for the prescription claim, the computing device of an example embodiment, such as the processing circuitry 22, the processor 24, the communication interface 28 or the like, is also configured to cause a reversal message to be transmitted to the request processor to cause the medication to be eliminated from the prescription claim submitted by the pharmacy management system. See signal flow 5 of FIG. 5. In this example embodiment, the database 30 may be configured to not only store the first message, the first response and the response to the source of the electronic message, but the database may also store the reversal message, such as in a respective database table, so as to maintain complete record of the messaging triggered by the electronic message.

As another example of an action taken based upon a second portion of an electronic message, an additional message may be transmitted to a different entity 18. In this regard, in an instance in which the analysis of the second portion of the electronic message identifies a predefined type of information included therewithin, the computing device 20 of an example embodiment, such as the processing circuitry 22, the processor 24 or the like, is configured to transform the information included within the second portion so as to have a predefined format, different than the first predefined format, and to cause a second message in the predefined format to be transmitted to the different entity. Thus, the analysis of the second portion of the electronic message of this embodiment permits the service provider 14 to generate and transmit two different messages, one to the request processor 16 and the other to other entity, with each message formatted differently, albeit appropriately for the request processor or the other entity, thereby facilitating efficient communication by the source 12 with the request processor and the other entity.

Figure 6:
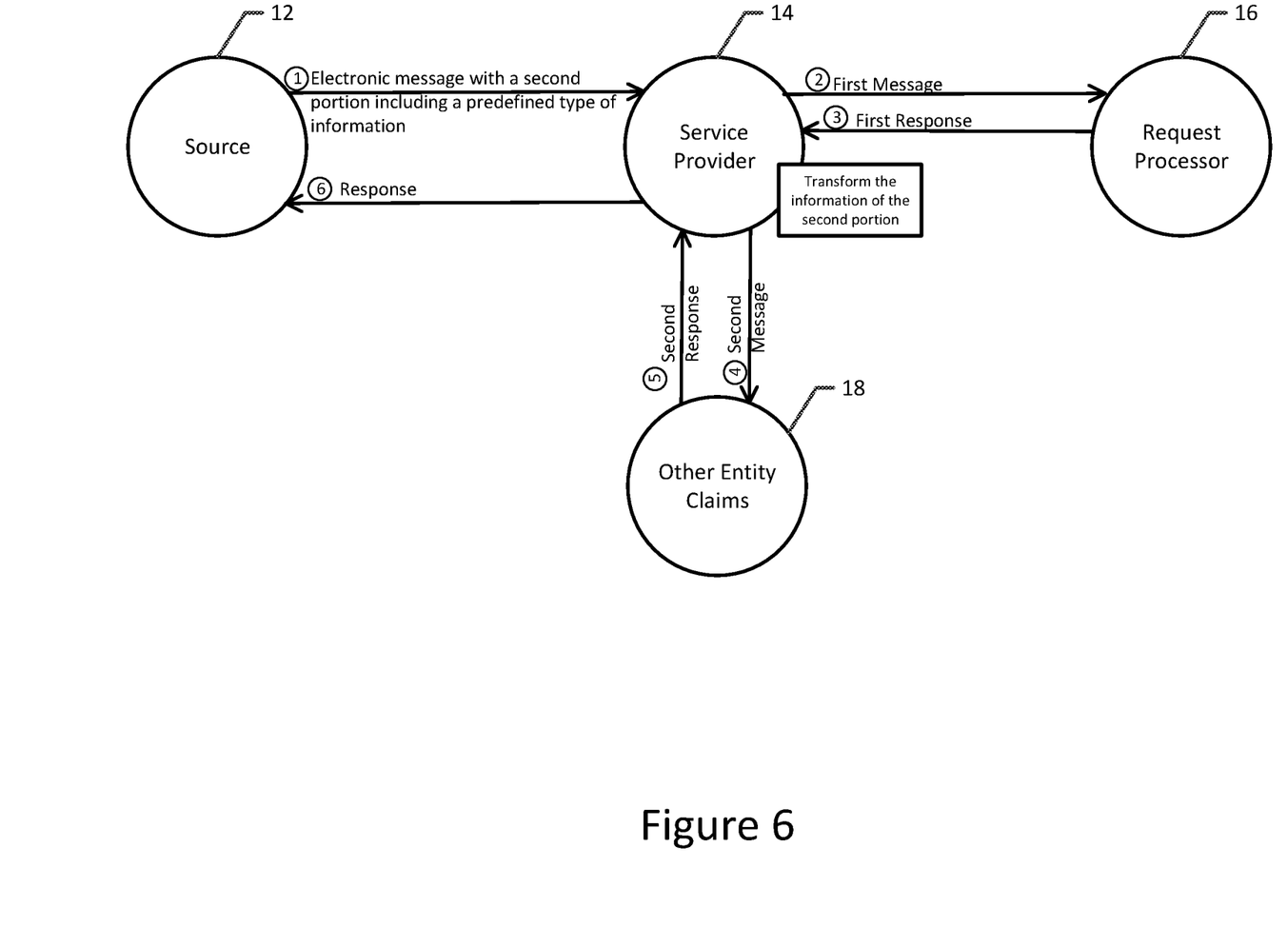
FIG. 6 is a signal flow diagram illustrating the messages exchanged in conjunction with the processing of an electronic message having a second portion that triggers communication with another entity in accordance with an example embodiment of the present invention.

By way of example, FIG. 6 depicts the transmission of an additional message to another entity 18, such as a medical claims processor, in response to receipt and processing of an electronic healthcare message. In this example embodiment, the second portion of the electronic healthcare message includes a predefined type of information in the form of information regarding a medical claim, which may be separately processed by the service provider 14 and as such, the electronic healthcare message of this example embodiment effectively conveys information regarding both a medical claim and a prescription claim, which are formatted differently and are typically processed differently via two different message streams. Thus, the computing device 20 of this example embodiment again increases the efficiency with which prescription claims and medical claims are evaluated by reducing message traffic, such as by reducing the instances in which separate messages must be processed by the claims processor, the medical claims processor or the like.

In this example embodiment, the electronic healthcare message that is received via signal flow 1 of FIG. 6 from the pharmacy management system includes the first portion typically formatted in accordance with NCPDP, including information regarding a prescription claims request, such as a prescription reimbursement request or a predetermination of benefits request, and a second portion formatted differently than the first portion and including a predefined type of information, such as information regarding a medical claim. Various types of data elements may be submitted by the pharmacy management system within the second portion of the electronic healthcare message representative of different medical procedures performed at a pharmacy, such as by a pharmacist. The medical procedures include, but are not limited to, vaccinations, immunizations, flu shots, diabetic testing, medical management services and an increasing number of other medical procedures that pharmacists are authorized to perform.

As described above, the computing device 20 of this example embodiment, such as the processing circuitry 22, the processor 24 or the like, is configured to cause a first message that is based at least in part upon the first portion to be transmitted as shown by signal flow 2 to the request processor 16 in order to analyze a prescription claim request and to receive a first response from the request processor as shown by signal flow 3. The communication between service provider 14 and the request processor is based upon the first portion of the electronic healthcare request relating to a prescription claim request and not the second portion of the electronic healthcare message that includes information regarding a medical claim request. As shown in FIG. 6, the computing device, such as the processing circuitry, the processor or the like, is also configured to transform the information included in the second portion, such as by constructing a medical claim in a predefined format, different than the first predefined format. Although the medical claim may have various formats, the medical claim may be an 837 claim constructed in accordance with an example embodiment to have an X12 format consistent with medical claims processing. The computing device, such as the processing circuitry, the processor, the communication interface 28 or the like, is also configured to cause the medical claim in a predefined format, such as the X12 format, to be transmitted as a second message to a medical claims processor of or associated with the medical claims payor, such as an insurance company or the like. See signal flow 4 of FIG. 6. The medical claims processor may, in turn, evaluate the medical claim and may provide a second response at signal flow 5 indicating whether the medical claim will be paid and, if so, the reimbursement amount for the medical claim or, if not, a reason for which the medical claim request was denied in whole or in part. As shown by signal flow 6 of FIG. 6, the computing device, such as the processing circuitry, the processor, the communication interface or the like, may, in turn, provide a response to the pharmacy management system including, for example, the response provided by the request processor and/or the response provided by the medical claims processor. In this example embodiment, the database 30 may be configured to not only store the first message, the first response and the response to the source of the electronic message, but the database may also store the second message and the second response, such as in respective database tables, so as to maintain complete record of the messaging triggered by the electronic message.

As yet another example of an action taken based upon a second portion of an electronic message, the response to the electronic message may be modified in an instance in which the analysis of the second portion of the electronic message, and/or the analysis of the first portion of the electronic message, the first response and/or the second response, so as to identify a document to be provided, such as to the source 12. In this regard, the computing device 20, such as the processing circuitry 22, the processor 24, the communication interface 28 or the like, is configured to cause the response to the electronic message that is provided to be dynamically constructed based upon information from the first or second portion of the electronic message, the first response from the request processor or the second response from the entity so as to include an access mechanism, such as an address, e.g., a uniform resource locator (URL), from which a document may be accessed. Upon receipt, the source may access the access mechanism, such as by actuating the URL, in order to retrieve the document. As such, the document may be readily reviewed and/or printed or otherwise saved without much effort by the source.

For example, in the healthcare context, the action taken as a result of the analysis of the second portion of the electronic healthcare request, and/or as a result of the analysis of the first portion of the electronic message, the first response and/or the second response, facilitates the printing by or other provision of documentation associated with a prescription to a pharmacy, and as applicable, to a patient of the pharmacy. Such documentation associated with the prescription may be required in some instances as a condition associated with the dispensing of the medication that is the subject of the prescription, such as to provide information regarding side effects, information regarding dangers associated with concurrently taking other medication or the like. Typically, the provision of such documentation to patients has been time consuming on behalf of the pharmacy such that the provision of such documentation according to this example embodiment greatly increases the efficiency with which the documentation may be provided as well as the reliability associated with the provision of the documentation.

As a result of the inclusion of a second portion within the electronic message that can include additional and/or different information from that which must be included within the first portion, the computing device 20, such as the processing circuitry 22, the processor 24, the communication interface 28 or the like, is configured to provide ready access to documentation associated with the prescription including, for example, patient education resources, medication adherence information, patient assistance program opportunities, etc. that has not heretofore been included within the messaging directed to the pharmacy. In this regard, the inclusion of an access mechanism, such as an address, e.g., a URL, in the response to the pharmacy permits patient education resources, medication adherence information, patient assistance program opportunities and other documents to be readily accessed. In this example embodiment, the computing device 20, such as the processing circuitry 22, the processor 24 or the like, is configured to analyze the second portion of the electronic healthcare message, and/or the first portion of the electronic message, the first response and/or the second response, so as to identify a document to be provided by a pharmacy to its patient. For example, business rules may be applied to the second portion of the electronic healthcare message in order to determine that a document is to be provided. In this regard, the computing device, such as the processing circuitry, the processor, the communication interface 28 or the like, is also configured to cause the response to the electronic healthcare message that is provided to the pharmacy management system to be dynamically constructed based upon information from the first or second portion of the electronic message, the first response from the request processor or the second response from the entity so as to include an access mechanism, such as an address, accessible by the pharmacy or by a patient of the pharmacy, in order to retrieve the document, such as for printing, review, storage or the like. Although the access mechanism associated with the document may be provided in various manners, the access mechanism of an example embodiment is an address, such as a URL, that is associated with and links to the document upon actuation by a pharmacist, a pharmacy technician, a patient or the like. In this example embodiment, the response to the electronic healthcare message that is provided to the pharmacy management system may be modified so as to include not only the response from the request processor 16, but also the access mechanism, such as the address, e.g., URL, associated with the document. Thus, a pharmacist or a patient of the pharmacy may readily retrieve and review the documentation. The documentation may be stored, such as in memory 26, database 30 or another storage device. In addition, the computing device, such as the processing circuitry, the processor or the like, may be configured to control access to the document and to maintain a record of access to the document with such record stored, for example, by the memory, database or the like.

In yet other embodiments, the action to be taken in the form of transmission of additional messages based upon the electronic message may be dependent upon the role of a person associated with the electronic message, such as the person that provided information conveyed via the electronic message and/or the person who authorized transmission of the electronic message and/or with which the electronic message is otherwise associated. In this example embodiment, the analysis of the second portion of the electronic message by the computing device 20, such as the processing circuitry 22, the processor 24 or the like, is configured to identify a role indicator. As such, the action to be taken based upon the analysis of the second portion of the electronic message is based upon the role indicator in this example embodiment. For example, the computing device, such as the processing circuitry, the processor or the like, may be configured to condition transmission of the first message to the request processor 16 or the provision of the response to the electronic message based upon the role indicator having a predefined value. Thus, the submission of the electronic message by an individual having a certain role may cause the transmission of the first message and the provision of the response to the electronic message, but the submission on the same electronic message by person of a different role, that is, having a role indicator that does not have the predefined value, may be processed in a manner that prevents the transmission of the first message to the request processor or the provision of the response to the electronic message. Thus, the analysis of the second portion of the electronic message in accordance with this example embodiment permits the behavior of the service provider 14 to be controlled based upon the role indicator.

As noted above, FIG. 3 is a flowchart illustrating the operations performed by a method, apparatus and computer program product, such as computing device 10 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 16 of a computing device employing an embodiment of the present invention and executed by a processor 14 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to parse and differently process different portions of an electronic healthcare message, the computing device comprising:
    a communication interface configured to receive the electronic healthcare message comprising a first portion formatted in accordance with a first predefined format and a second portion formatted differently than the first portion, wherein the first predefined format is in accordance with a standard associated with submission of prescription claim requests;
    processing circuitry configured to:
        parse the electronic healthcare message to separately identify the first and second portions;
        analyze the second portion of the electronic healthcare message to identify (i) an action to be taken based thereupon, (ii) a cost paid by a pharmacy for a medication associated with the electronic healthcare message, and (iii) whether information associated with a medical claim is included within the second portion;
        construct a first message in the form of a prescription claim request formatted in accordance with the first predefined format based upon the first portion and not the second portion to be transmitted to a prescription claims processor;
        based upon the first message including the first portion formatted in accordance with the first predefined format, receive a first response comprising a reimbursement amount for the medication associated with the electronic healthcare message from the prescription claims processor;
        in accordance with a determination that the cost paid by the pharmacy for the medication exceeds the reimbursement amount, construct a response to the electronic healthcare message that includes a rejection of the prescription claim request for transmission to the pharmacy and construct a reversal message to be transmitted by the computing device to the prescription claims processor to cause the medication to be eliminated from the prescription claim request without reliance upon analysis by the pharmacy of the reimbursement amount;
        in an instance in which the analysis of the second portion of the electronic healthcare message identifies information associated with a medical claim included within the second portion, transform the information included within the second portion so as to have a second predefined format, different that the first predefined format, wherein the second predefined format is in accordance with a standard associated with medical claims processing and is based at least in part on the information associated with the medical claim included within the second portion;
        construct a second message in the form of a medical claim request in the second predefined format from the information transformed to have the second predefined format to be transmitted to a medical claims processor different than the prescription claims processor and different than a source of the electronic healthcare message such that first and second different messages are both separately constructed from separate respective portions of a single electronic message, wherein the first and second different messages are constructed with different formats for transmission to different recipients based upon different portions of the single electronic healthcare message;
        based upon the second message including the information transformed to have the second predefined format, receive a second response from the medical claims processor; and
        based upon at least one of the first response from the prescription claims processor or the second response from the medical claims processor, construct a response to the electronic healthcare message that is to be transmitted; and
    a database in communication with the processing circuitry and configured to store one or more of the electronic healthcare message, the first message, the first response, the second message, the second response or the response to the electronic healthcare message.

2. A computing device according to claim 1 wherein the processing circuitry is configured to parse the electronic healthcare message by parsing the electronic healthcare message to identify a qualifier indicative of a presence of the second portion within the electronic healthcare message, a presence of the first portion within the electronic healthcare message, and whether the first portion is formatted in accordance with the standard associated with submission of prescription claim requests.

3. A computing device according to claim 1 wherein the processing circuitry is configured to analyze the second portion of the electronic healthcare message by identifying a system edit instruction, and wherein the processing circuitry is configured to construct the first message to be transmitted to the prescription claims processor by modifying the first portion as to include additional information associated with a medical patient in accordance with the system edit instruction prior to transmitting the first message to the prescription claims processor.

4. A computing device according to claim 1 wherein the processing circuitry is further configured to identify a document to be provided, and wherein the processing circuitry is configured to construct the response to the electronic healthcare message that is provided based upon information from the first or second portion of the electronic healthcare message, the first response from the prescription claims processor or the second response from the medical claims processor to include an access mechanism that is accessible in order to retrieve the document.

5. A computing device according to claim 4 wherein the document to be provided is stored, and wherein the processing circuitry is configured to control access to the document and to maintain a record of access to the document.

6. A computing device according to claim 1 wherein the processing circuitry is configured to analyze the second portion of the electronic healthcare message to identify a role indicator, and wherein the action to be taken is based upon the role indicator.

7. A computing device according to claim 6 wherein the processing circuitry is configured to condition transmission of the first message to the prescription claims processor or provision of the response to the electronic healthcare message upon the role indicator having a predefined value.

8. A method for parsing and differently processing different portions of an electronic healthcare message, the method comprising:

receiving the electronic healthcare message comprising a first portion formatted in accordance with a first predefined format and a second portion formatted differently than the first portion, wherein the first predefined format is in accordance with a standard associated with submission of prescription claim requests;

parsing the electronic healthcare message to separately identify the first and second portions;

analyzing the second portion of the electronic healthcare message to identify (i) an action to be taken based thereupon, (ii) a cost paid by a pharmacy for a medication associated with the electronic healthcare message, and (iii) whether information associated with a medical claim is included within the second portion;

constructing a first message in the form of a prescription claim request formatted in accordance with the first predefined format based upon the first portion and not the second portion to be transmitted to a prescription claims processor;

based upon the first message including the first portion formatted in accordance with the first predefined format, receiving a first response comprising a reimbursement amount for the medication associated with the electronic healthcare message from the prescription claims processor;

in accordance with a determination that the cost paid by the pharmacy for the medication exceeds the reimbursement amount, constructing a response to the electronic healthcare message that includes a rejection of the prescription claim request for transmission to the pharmacy and constructing a reversal message to be transmitted by the computing device to the prescription claims processor to cause the medication to be eliminated from the prescription claim request without reliance upon analysis by the pharmacy of the reimbursement amount;

in an instance in which the analysis of the second portion of the electronic healthcare message identifies information associated with a medical claim included within the second portion, transforming the information included within the second portion so as to have a second predefined format, different that the first predefined format, wherein the second predefined format is in accordance with a standard associated with medical claims processing and is based at least in part on the information associated with the medical claim included within the second portion;

constructing a second message in the form of a medical claim request in the second predefined format from the information transformed to have the second predefined format to be transmitted to a medical claims processor different than the prescription claims processor and different than a source of the electronic healthcare message such that first and second different messages are both separately constructed from separate respective portions of a single electronic healthcare message, wherein the first and second different messages are constructed with different formats for transmission to different recipients based upon different portions of the single electronic healthcare message;

based upon the second message including the information transformed to have the second predefined format, receiving a second response from the medical claims processor;

based upon at least one of the first response from the prescription claims processor or the second response from the medical claims processor, constructing a response to the electronic healthcare message that is to be transmitted; and in a database, storing one or more of the electronic healthcare message, the first message, the first response, the second message, the second response or the response to the electronic healthcare message.

9. A method according to claim 8 wherein parsing the electronic healthcare message comprises parsing the electronic healthcare message to identify a qualifier indicative of a presence of the second portion within the electronic healthcare message, a presence of the first portion within the electronic healthcare message, and whether the first portion is formatted in accordance with the standard associated with submission of prescription claim requests.

10. A method according to claim 8 wherein analyzing the second portion of the electronic healthcare message comprises identifying a system edit instruction, and wherein constructing the first message to be transmitted to the prescription claims processor comprises modifying the first portion as to include additional information associated with a medical patient in accordance with the system edit instruction prior to transmitting the first message to the prescription claims processor.

11. A method according to claim 8 further comprising identifying a document to be provided, and wherein constructing the response to the electronic healthcare message to be provided is based upon information from the first or second portion of the electronic healthcare message, the first response from the prescription claims processor or the second response from the medical claims processor and comprises including an access mechanism that is accessible in the response in order to permit the document to be retrieved using the access mechanism.

12. A method according to claim 11 wherein the document to be provided is stored, and wherein the method further comprises controlling access to the document and maintaining a record of access to the document.

13. A method according to claim 8 wherein analyzing the second portion of the electronic healthcare message comprises identifying a role indicator, and wherein the action to be taken is based upon the role indicator.

14. A method according to claim 13 further comprising conditioning transmission of the first message to the prescription claims processor or provision of the response to the electronic healthcare message upon the role indicator having a predefined value.

15. A computer program product configured to parse and differently process different portions of an electronic healthcare message, the computer program product comprising a non-transitory computer readable medium having program code stored thereon, the program code comprising program code instructions configured, upon execution, to:

receive the electronic healthcare message comprising a first portion formatted in accordance with a first predefined format and a second portion formatted differently than the first portion, wherein the first predefined format is in accordance with a standard associated with submission of prescription claim requests;

parse the electronic healthcare message to separately identify the first and second portions;

analyze the second portion of the electronic healthcare message to identify (i) an action to be taken based thereupon, (ii) a cost paid by a pharmacy for a medication associated with the electronic healthcare message, and (iii) whether information associated with a medical claim is included within the second portion;

construct a first message in the form of a prescription claim request formatted in accordance with the first predefined format based upon the first portion formatted and not the second portion to be transmitted to a prescription claims processor;

based upon the first message including the first portion formatted in accordance with the first predefined format, receive a first response comprising a reimbursement amount for the medication associated with the electronic healthcare message from the prescription claims processor;

in accordance with a determination that the cost paid by the pharmacy for the medication exceeds the reimbursement amount, construct a response to the electronic healthcare message that includes a rejection of the prescription claim request for transmission to the pharmacy and construct a reversal message to be transmitted by the computing device to the prescription claims processor to cause the medication to be eliminated from the prescription claim request without reliance upon analysis by the pharmacy of the reimbursement amount;

in an instance in which the analysis of the second portion of the electronic healthcare message identifies information associated with a medical claim included within the second portion, transform the information included within the second portion so as to have a second predefined format, different that the first predefined format, wherein the second predefined format is in accordance with a standard associated with medical claims processing and is based at least in part on the information associated with the medical claim included within the second portion;

construct a second message in the form of a medical claim request in the second predefined format from the information transformed to have the second predefined format to be transmitted to a medical claims processor different than the prescription claims processor and different than a source of the electronic healthcare message such that first and second different messages are both separately constructed from separate respective portions of a single electronic healthcare message, wherein the first and second different messages are constructed with different formats for transmission to different recipients based upon different portions of the single electronic healthcare message;

based upon the second message including the information transformed to have the second predefined format, receive a second response from the medical claims processor;

based upon at least one of the first response from the prescription claims processor or the second response from the medical claims processor, construct a response to the electronic healthcare message that is to be transmitted; and in a database, store one or more of the electronic healthcare message, the first message, the first response, the second message, the second response or the response to the electronic healthcare message.

16. A computer program product according to claim 15 wherein the program code instructions configured to parse the electronic healthcare message comprise program code instructions configured to parse the electronic healthcare message to identify a qualifier indicative of a presence of the second portion within the electronic healthcare message, a presence of the first portion within the electronic healthcare message, and whether the first portion is formatted in accordance with the standard associated with submission of prescription claim requests.

17. A computer program product according to claim 15 wherein the program code instructions configured to analyze the second portion of the electronic healthcare message comprise program code instructions configured to identify a system edit instruction, and wherein the program code instructions configured to construct the first message to be transmitted to the prescription claims processor comprise program code instructions configured to modify the first portion as to include additional information associated with a medical patient in accordance with the system edit instruction prior to transmitting the first message to the prescription claims processor.

18. A computer program product according to claim 15 wherein the program code further comprises program code instructions configured to identify a document to be provided, and wherein the program code instructions configured to cause the response to the electronic healthcare message to be provided comprise program code instructions configured to construct the response to the electronic healthcare message that is to be provided based upon information from the first or second portion of the electronic healthcare message, the first response from the prescription claims processor or the second response from the medical claims processor so as to include an access mechanism that is accessible in order to retrieve the document.

19. A computer program product according to claim 15 wherein the program code instructions configured to analyze the second portion of the electronic message comprise program code instructions configured to identify a role indicator, and wherein the action to be taken is based upon the role indicator.

20. A computer program product according to claim 19 wherein the program code further comprises program code instructions configured to condition transmission of the first message to the prescription claims processor or provision of the response to the electronic healthcare message upon the role indicator having a predefined value.

21. A computing device according to claim 1 wherein the processing circuitry is configured to construct the response to the electronic healthcare message by modifying the response from an indication that the prescription claim will be paid at the reimbursement amount to an indication that the prescription claim is rejected.

22. A method according to claim 8 wherein constructing the response to the electronic healthcare message comprises modifying the response from an indication that the prescription claim will be paid at the reimbursement amount to an indication that the prescription claim is rejected.

* * * * *